United States Patent

Shamilian et al.

(10) Patent No.: US 9,357,014 B2
(45) Date of Patent: May 31, 2016

(54) SERVICE-BASED NETWORKING

(71) Applicant: Alcatel Lucent, Paris (FR)

(72) Inventors: John Shamilian, Tinton Falls, NJ (US); Sape Jurrien Mullender, Amsterdam (NL)

(73) Assignee: Alcatel Lucent, Boulogne-Billancourt (FR)

( * ) Notice: Subject to any disclaimer, the term of this patent is extended or adjusted under 35 U.S.C. 154(b) by 32 days.

(21) Appl. No.: 14/264,538

(22) Filed: Apr. 29, 2014

(65) Prior Publication Data

US 2015/0312352 A1 Oct. 29, 2015

(51) Int. Cl.
*H04L 29/06* (2006.01)
*H04L 29/08* (2006.01)

(52) U.S. Cl.
CPC .......... *H04L 67/141* (2013.01); *H04L 63/0428* (2013.01); *H04L 63/08* (2013.01); *H04L 63/168* (2013.01); *H04L 67/16* (2013.01)

(58) Field of Classification Search
None
See application file for complete search history.

(56) References Cited

U.S. PATENT DOCUMENTS

| 6,161,123 A * | 12/2000 | Renouard | H04L 29/06 709/203 |
| 2002/0053032 A1* | 5/2002 | Dowling et al. | 713/201 |
| 2005/0015427 A1* | 1/2005 | Guo et al. | 709/200 |
| 2010/0217975 A1* | 8/2010 | Grajek et al. | 713/157 |

* cited by examiner

*Primary Examiner* — David Pearson
(74) *Attorney, Agent, or Firm* — Tong, Rea, Bentley & Kim, LLC

(57) ABSTRACT

A service-based networking capability is presented. The service-based networking capability replaces traditional networking connections between endpoints with service connections between endpoints. The service-based networking capability supports establishment and use of a service connection between endpoints, where the service connection between endpoints may be provided below the application layer and above the transport layer. The establishment and use of a service connection between endpoints may be provided using a connected services stack, which may include a connected services layer that is configured to operate below the application layer and above the transport layer.

19 Claims, 8 Drawing Sheets

SERVICE-BASED NETWORKING

TECHNICAL FIELD

The disclosure relates generally to communication networks and, more specifically but not exclusively, to connections in communication networks.

BACKGROUND

Networking connections are currently identified by Internet Protocol (IP) address and port number. With the advent of mobility, and now cloud-based computing, the IP address of a host of a networking connection may change. Disadvantageously, in order to maintain the networking connection and hide the change from the application, either the IP address is forced to remain the same while rerouting packets or the networking connection is closed and a new networking connection is opened. Additionally, there are various other problems and disadvantages associated with existing implementations of networking connections. Accordingly, there is a need for improvements in support for networking connections.

SUMMARY OF EMBODIMENTS

Various deficiencies in the prior art are addressed by embodiments for service-based networking.

In at least some embodiments, an apparatus includes a processor and a memory communicatively connected to the processor, where the processor is configured to run a connected services stack. The connected services stack includes a connected services layer disposed below an application layer and above a transport layer. The connected services layer is configured to support establishment of a service connection between the connected services layer and a remote connected services layer of a remote endpoint.

In at least some embodiments, a method includes using a processor and a memory for running a connected services stack. The connected services stack includes a connected services layer disposed below an application layer and above a transport layer, the connected services layer configured to support establishment of a service connection between the connected services layer and a remote connected services layer of a remote endpoint.

In at least some embodiments, a computer-readable storage medium stores instructions which, when executed by a computer, cause the computer to perform a method including running a connected services stack. The connected services stack includes a connected services layer disposed below an application layer and above a transport layer, the connected services layer configured to support establishment of a service connection between the connected services layer and a remote connected services layer of a remote endpoint.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

A service-based networking capability is presented. In at least some embodiments, the service-based networking capability replaces traditional networking connections between endpoints with service connections between endpoints. In at least some embodiments, the service-based networking capability supports establishment and use of a service connection between endpoints. The service connection between endpoints may be provided above the transport layer and below the application layer. In at least some embodiments, the establishment and use of a service connection between endpoints may be provided using a connected services stack, which may include a connected services layer, disposed below an application layer and above a transport layer, that is configured to support establishment and use of the service connection. In general, use of a service connection between endpoints may provide various advantages over use of traditional transport layer connections between endpoints, such as obviating the need for applications or services to have knowledge of the underlying communication network, enabling applications or services to connect by name only, obviating the need for applications or services to be concerned with connectivity or failover (e.g., maintaining service connections, as well as the associated application layer communications running on top of service connections, through IP address changes of the endpoints), enabling restarting of an application or service after a hardware failure, enabling growing of an application or service (e.g., starting a new instance of the application or service and moving already running sessions of the application or service onto the new instance of the application or service in a manner transparent to the application or service clients of the application or service), enabling shrinking of an application or service (e.g., terminating an existing instance of the application or service and moving already running sessions of the application or service from the terminated instance of the application or service onto a different instance of the application or service in a manner transparent to the application or service clients of the application or service), enabling applications to become stateless or at least nearly stateless, handling retransmission timeouts, handling IP address changes (e.g., IP address change notifications) in a manner transparent to the application or service client of the application or service, or the like, as well as various combinations thereof.

Figure 1:
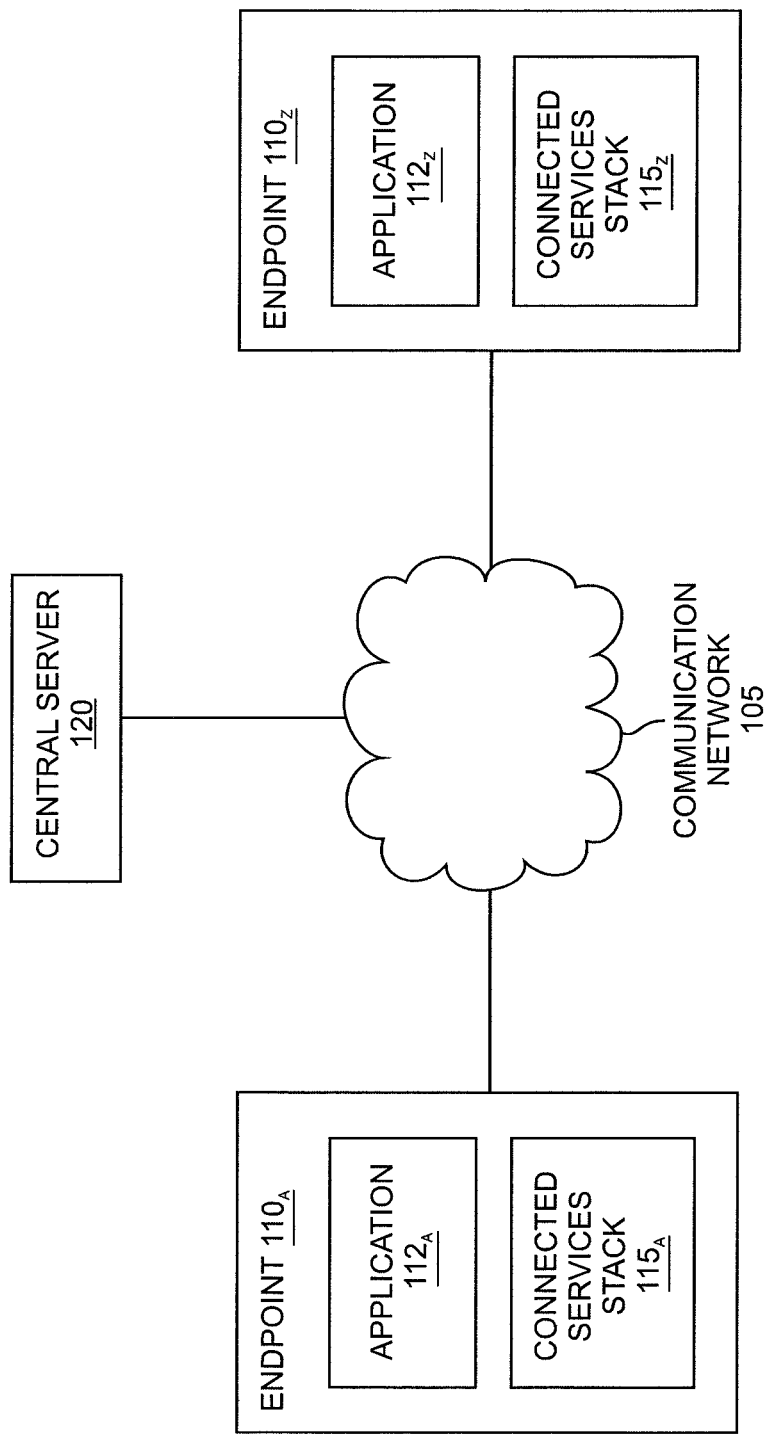
FIG. 1 depicts an exemplary communication system configured to support service-based networking using a connected services stack.

These and various other embodiments and advantages of the service-based networking capability may be better understood by way of reference to the exemplary communication system of FIG. 1.

FIG. 1 depicts an exemplary communication system configured to support service-based networking using a connected services stack. The communication system 100 includes a communication network 105, a first endpoint $110_A$ that is communicatively connected to communication network 105 and a second endpoint $110_Z$ that is communicatively connected to communication network 105 (collectively, endpoints 110), and a central server 120 that also is communicatively connected to communication network 105.

The communication network 105 may include any communication network(s) which may support communications described within the context of FIG. 1. For example, communication network 105 may be considered to include a wireline access network(s), a wireline core network, a wireless access network, a wireless core network, a service provider access network, a service provider core network, the Internet, or the like, as well as various combinations thereof.

The endpoints 110 may be any devices which may communicate at the application layer. For example, endpoints 110 may be two end user devices (e.g., two smartphones, two computers, a smartphone and a computer, or the like), an end user device and a network-based device (e.g., a content server, a host server running a virtual machine (VM) hosting a service, or the like), two network-based devices, two devices configured for machine-to-machine (M2M) type communications, or the like), or the like, as well as various combinations thereof. As depicted in FIG. 1, the endpoints $110_A$ and $110_B$ include applications $112_A$ and $112_B$ (collectively, applications 112). For example, the applications 112 may include any applications or services which may be supported by endpoints 110 (e.g., a messaging application or service, a voice-over-IP (VoIP) application or service, a social media application or service, a cloud computing application or service, an energy meter monitoring application or service, or the like. As further depicted in FIG. 1, the endpoints $110_A$ and $110_B$ are running connected services stacks (CSSs) $115_A$ and $115_B$ (collectively, CSSs 115), respectively, which are configured to support communications associated with applications $112_A$ and $112_B$, respectively. An exemplary CSS 115 is depicted in FIG. 2.

Figure 2:
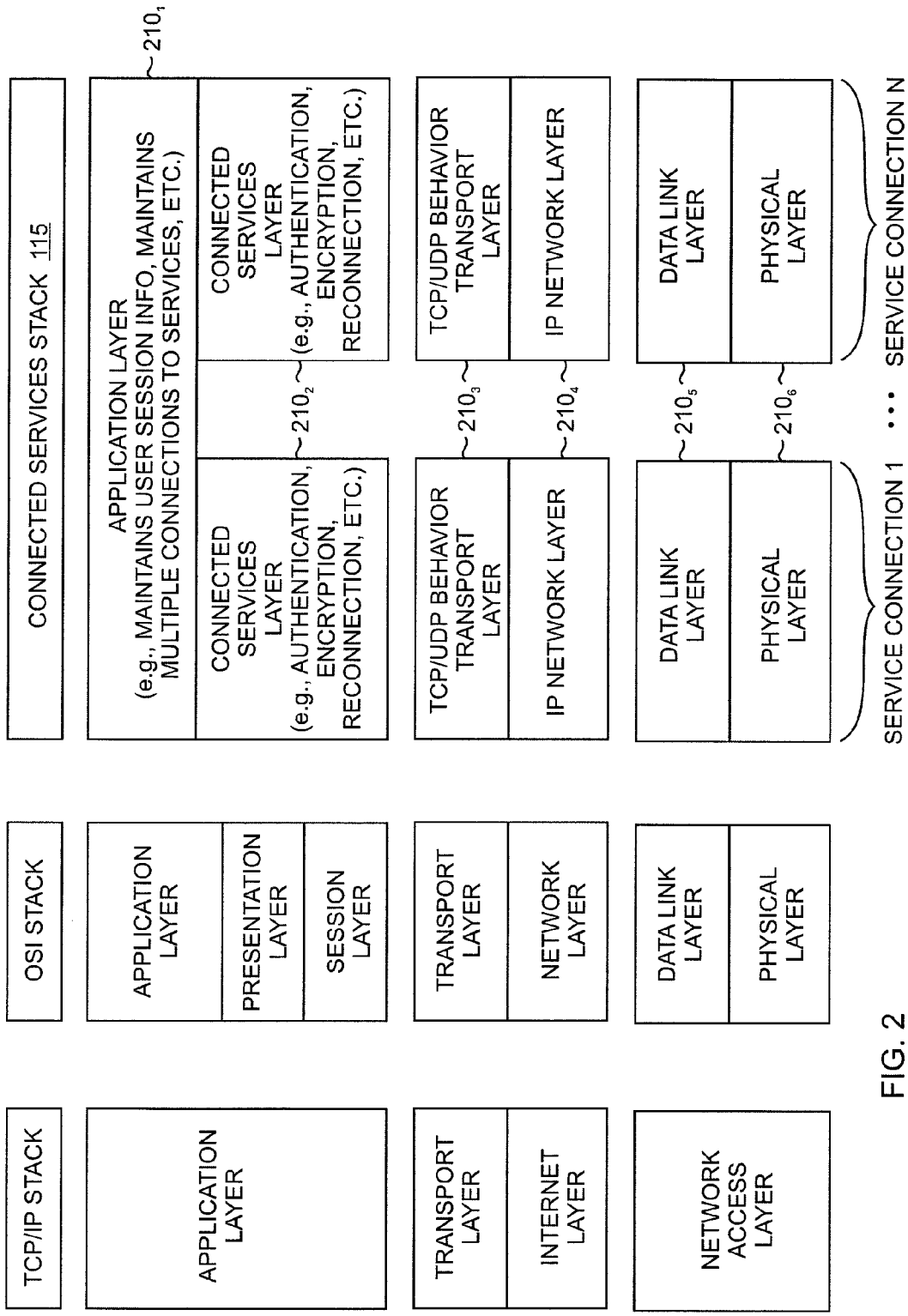
FIG. 2 depicts an exemplary embodiment of the connected services stack of FIG. 1.

FIG. 2 depicts an exemplary embodiment of the connected services stack of FIG. 1. As depicted in FIG. 2, CSS 115 includes a number of communication layers 210 which, for purposes of clarity, are mapped to communication layers of two commonly-used communication stacks (illustratively, the Transmission Control Protocol (TCP)/Internet Protocol (IP) Stack and the Open Systems Interconnection (OSI) Stack).

The CSS 115 includes (1) an application layer (AL) $210_1$ that may be mapped to a portion of the AL of the TCP/IP Stack and that may be mapped to the AL of the OSI Stack, (2) a connected services layer (CSL) $210_2$, below the AL $210_1$, that may be mapped to a portion of the AL of the TCP/IP Stack and that may be mapped to the presentation layer (PL) and session layer (SL) of the OSI Stack, (3) a transport layer (TL) $210_3$, below the CSL $210_2$, that may be mapped to the TL of the TCP/IP Stack and that may be mapped to the TL of the OSI Stack, (4) an IP Network Layer (IPNL) $210_4$, below the TL $210_3$, that may be mapped to the Internet layer (IL) of the TCP/IP Stack and that may be mapped to the network layer (NL) of the OSI Stack, (4) a data link layer (DLL) $210_5$, below the IPNL $210_4$, that may be mapped to the network access layer (NAL) of the TCP/IP Stack and that may be mapped to the DLL of the OSI Stack, and a physical layer (PL) $210_6$, below the DLL $210_5$, that maps to the network access layer (NAL) of the TCP/IP Stack and that maps to the PL of the OSI Stack.

The operation of communication layers 210 of CSS 115 may be the same as the operation of corresponding communication layers of the TCP/IP Stack or OSI Stack in at least some respects and different than the operation of corresponding communication layers of the TCP/IP Stack or OSI Stack in at least some other respects, and such similarities and differences are discussed in additional detail below.

The AL $210_1$ is configured to provide some functions typically provided at the application layer although, as discussed further herein, CSL $210_2$ is configured such that AL $210_1$ may be implemented differently than existing application layers (e.g., unlike existing application layers, AL $210_1$ is not required to have knowledge of the underlying communication network, may connect to services by name only, is not required to be concerned with connectivity or failover (including local or remote IP address changes), and so forth). The AL $210_1$ is configured to maintain one or more application layer connections to applications or services (e.g., applications 112 depicted and described with respect to FIG. 1). The AL $210_1$ is configured to maintain user session information for application layer sessions.

The CSL $210_2$ is configured to support service-based networking in which a service connection may be established between endpoints 110 and used for communication between endpoints 110. The CSL $210_2$ is configured to perform authentication functions, encryption functions, reconnection functions, timeout handling functions (e.g., retransmissions, IP address change notifications, session cancelling functions, or the like), or the like, as well as various combinations thereof. The CSL $210_2$ may be configured in a manner for obviating the need for applications or services to have knowledge of the underlying communication network, enabling applications or services to connect by name only, obviating the need for applications or services to be concerned with connectivity or failover (e.g., maintaining service connections, as well as the associated application layer communications running on top of service connections, through IP address changes of either or both of the endpoints), enabling restarting of an application or service after a hardware failure, enabling growing of an application or service (e.g., starting a new instance of the application or service and moving already running sessions of the application or service onto the new instance of the application or service in a manner transparent to the application or service clients of the application or service), enabling shrinking of an application or service (e.g., terminating an existing instance of the application or service and moving already running sessions of the application or service from the terminated instance of the application or service onto a different instance of the application or service in a manner transparent to the application or service clients of the application or service), enabling applications to become stateless or at least nearly stateless, handling retransmission timeouts, handling IP address changes (e.g., IP address change notifications) in a manner transparent to the application or service client of the application or service, or the like, as well as various combinations thereof.

The TL $210_3$ is configured to provide various functions typically supported at the transport layer (e.g., TCP or TCP-like behavior, UDP or UDP-like behavior, or the like, as well as various combinations thereof), although CSL $210_2$ is configured such that some functions typically provided at the transport layer in existing communication stacks do not need to be supported by TL $210_3$.

The IPNL $210_4$ is configured to provide various functions typically supported at the network layer or Internet layer of existing communication stacks, as will be understood by one of ordinary skill in the art. The IPNL $210_4$ also may be configured to provide IP reporting/updating functions.

The DLL $210_5$ is configured to provide various functions typically supported at the data link layer of existing communication stacks, as will be understood by one of ordinary skill in the art.

The PL $210_6$ is configured to provide various functions typically supported at the physical layer of existing communication stacks, as will be understood by one of ordinary skill in the art.

As depicted in FIG. 2, CSS 115 is configured to support one or more service connections (illustratively, service connections 1–N). Accordingly, the columns of CSS 115 that are labeled as being associated with service connections 1–N illustrate that various layers of CSS 115 may be configured to support any suitable number of service connections. The service connections may be established to support communications between respective applications on the associated endpoint on which CSS 115 is executing (illustratively, communications of application $112_A$ of endpoint $110_A$ may be supported by service connection 1, communications of a second application of endpoint $110_A$ may be supported by service connection 2, and so forth) and respective applications on one or more other endpoints (e.g., one or more applications on endpoint $110_Z$, one or more applications on one or more other endpoints, or the like, as well as various combinations thereof). The establishment and use of service connections is depicted and described in additional detail below with respect to FIGS. 3-7.

It will be appreciated that the operation of the CSS 115 is primarily depicted and described herein within the context of communication layers 210 for purposes of illustrating correlations or potential correlations between functions of CSS 115 and layers or functions of the TCP/IP and OSI Stacks. In other words, it will be appreciated that, although depicted and described herein within the context of communication layers 210, communication layers 210 may simply represent respective functions or sets of functions which may be provided CSS 115. Accordingly, in at least some embodiments, various references herein to communication layers 210 of CSS 115 may be read more generally as being functions or sets of functions of CSS 115, which may be arranged using other numbers or arrangements of communication layers, which may be implemented independent of any strictly or loosely defined communication layers, which may be provided in any suitable arrangements (e.g., supporting various types of interactions or interdependencies between various functions or sets of functions), or the like, as well as various combinations thereof.

The operation of the various communication layers 210 of CSS 115 of FIG. 2 may be better understood by considering the use of CSS 115 by the endpoints 110 of FIG. 1, as discussed in additional detail below with respect to FIGS. 3-7.

Figure 3:
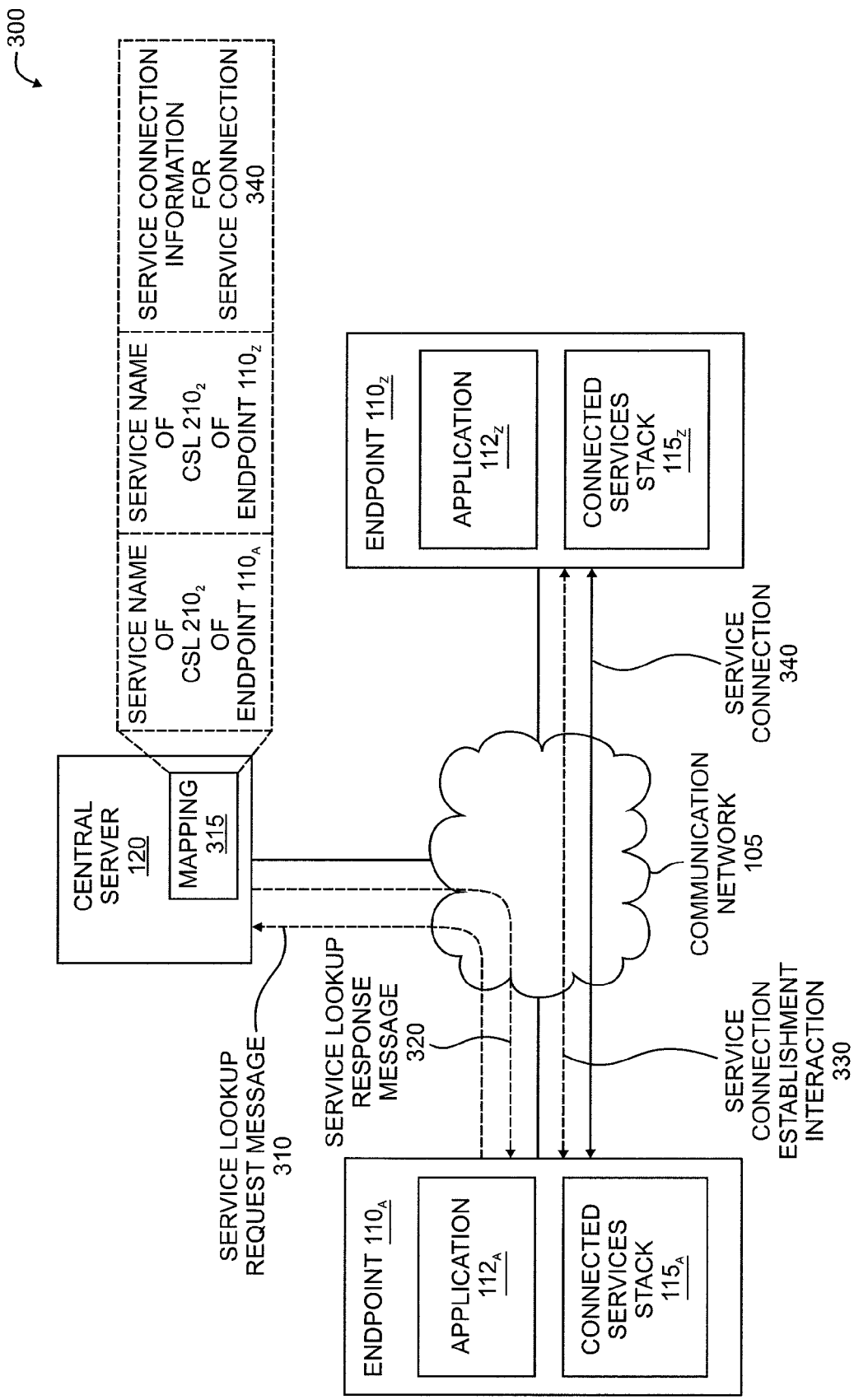
FIG. 3 depicts an exemplary message flow for establishment of a service connection between endpoints within the context of FIG. 1.

FIG. 3 depicts an exemplary message flow for establishment of a service connection between endpoints within the context of FIG. 1. More specifically, FIG. 3 depicts the exemplary communication system 100 of FIG. 1 and an exemplary message flow 300 that results in establishment of a service connection between the endpoints 110 for purposes of supporting application layer communications between the endpoints 110.

The CSL $210_2$ of CSS $115_A$ at endpoint $110_A$ initiates a request for establishment of a service connection with the CSL $210_2$ of CSS $115_Z$ at endpoint $110_Z$. The request by CSL $210_2$ of CSS $115_A$ for the establishment of the service connection with the CSL $210_2$ of CSS $115_Z$ may be initiated responsive to any suitable trigger condition (e.g., responsive to an indication that the AL $210_1$ at endpoint $110_A$ wants to communicate with the AL $210_1$ at endpoint $110_Z$, based on an expectation that the AL $210_1$ at endpoint $110_A$ may want to communicate with the AL $210_1$ at endpoint $110_Z$, and so forth).

The CSL $210_2$ of CSS $115_A$ at endpoint $110_A$ initiates the request for establishment of a service connection with the CSL $210_2$ of CSS $115_Z$ at endpoint $110_Z$ by sending a service lookup request message 310 to central server 120. The service lookup request message 310 is a request for service connection information for use by CSL $210_2$ of CSS $115_A$ at endpoint $110_A$ in establishing the service connection with the CSL $210_2$ of CSS $115_Z$ at endpoint $110_Z$, and, further, for use by the CSLs $210_2$ of endpoints 110 in using the service connection eventually established between CSL $210_2$ of CSS $115_A$ and CSL $210_2$ of CSS $115_Z$. The service lookup request message 310 includes a service name of the CSL $210_2$ of CSS $115_A$ at endpoint $110_A$, and a service name of the CSL $210_2$ of CSS $115_Z$ at endpoint $110_Z$. The service name of a CSL $210_2$ of a CSS 115 may be provided in any suitable format (e.g., a text-based string, a Uniform Resource Locator (URL) or a name having a URL-like format, or the like, as well as various combinations thereof).

The central server 120 receives the service lookup request message 310 from the CSL $210_2$ of CSS $115_A$ at endpoint $110_A$, obtains service connection information for the service connection (e.g., generates the service connection information, retrieves the service connection information, or the like, as well as various combinations thereof) responsive to the service lookup request message 310, stores a mapping 315 between the service names of the CSLs $210_2$ of the CSSs 115 of the endpoints 110 and the service connection information for the service connection, and sends a service lookup response message 320 to the CSL $210_2$ of CSS $115_A$ at endpoint $110_A$ where the service lookup response message 320 includes the service connection information for the service connection. The service connection information for the service connection includes a service connection identifier of the service connection, IP addresses of the endpoints 110, and, optionally, one or more encryption keys for use by the endpoints 110 in encrypting data to be exchanged between the endpoints 110 using the service connection. The service lookup response message 320 includes the service name of the CSL $210_2$ of CSS $115_Z$ (e.g., for use by CSL $210_2$ of CSS $115_A$ at endpoint $110_A$ in establishing and using the service connection) and, as noted above, the service connection information for the service connection.

The CSL $210_2$ of CSS $115_A$ at endpoint $110_A$ receives the service lookup response message 320 from central server 120. The CSL $210_2$ of CSS $115_A$ at endpoint $110_A$ initiates a service connection request message, to the CSL $210_2$ of CSS $115_A$ at endpoint $110_A$, based on the information in the service lookup response message 320 received from central server 120. The service connection request message initiated by CSL $210_2$ of CSS $115_A$ at endpoint $110_A$ may include the service name of CSL $210_2$ of CSS $115_A$ at endpoint $110_A$, the service name of CSL $210_2$ of CSS $115_Z$ at endpoint $110_Z$ (received in the service lookup response message 320), the IP address of the endpoint $110_A$, the IP address of the endpoint $110_Z$ (also received in the service lookup response message 320), and the service connection identifier (also received in the service lookup response message 320). The service connection request message initiated by CSL $210_2$ of CSS $115_A$ at endpoint $110_A$ also may include one or more encryption keys for the service connection (e.g., where such encryption keys are received in the service lookup response message 320). The service connection request message initiated by CSL $210_2$ of CSS $115_A$ at endpoint $110_A$ also may include one or more other connection parameters (e.g., required parameters for the service connection, desired parameters for the service connection, or the like, as well as various combinations thereof). The service connection request message initiated by CSL $210_2$ of CSS $115_A$ at endpoint $110_A$ also may include cryptographic information. The service connection request message initiated by CSL $210_2$ of CSS $115_A$ at endpoint $110_A$ also may include any other suitable types of information which may be included within connection requests between endpoints. The CSL $210_2$ of CSS $115_Z$ at endpoint $110_Z$ receives the service connection request message 310 initiated by CSL $210_2$ of CSS $115_A$ at endpoint $110_A$ and responds with a service connection response message (e.g., an acknowledgement message or any other suitable message) which may include some or all of the information included in the service connection request message initiated by CSL $210_2$ of CSS $115_A$ at endpoint $110_A$, additional information provided by the CSL $210_2$ of CSS $115_Z$ at endpoint $110_Z$ for CSL $210_2$ of CSS $115_A$ at endpoint $110_A$ (e.g., related to negotiation of connection parameters for the service connection), or the like, as well as various combinations thereof. The interaction between the CSL $210_2$ of CSS $115_A$ at endpoint $110_A$ and the CSL $210_2$ of CSS $115_Z$ at endpoint $110_Z$ in establishing the service connection may be a two-way connection/response interaction, a three-way handshake interaction (e.g., similar to the three-way handshake typically used for establishing TCP connections), or the like. Thus, the service connection request message and any associated responses from the CSL $210_2$ of CSS $115_Z$ at endpoint or additional exchanges between the CSL $210_2$ of CSS $115_A$ at endpoint $110_A$ and the CSL $210_2$ of CSS $115_Z$ at endpoint $110_Z$ within the context of establishing the service connection are represented in FIG. 3 by service connection establishment interaction 330.

The service connection establishment interaction 330 between CSL $210_2$ of CSS $115_A$ at endpoint $110_A$ and CSL $210_2$ of CSS $115_Z$ at endpoint $110_Z$ results in establishment of the service connection therebetween (which is indicated as service connection 340 in FIG. 3). Here, again, it is noted that the service connection 340 is a connection between CSLs $210_2$ of the endpoints 110 (rather than at the transport layers of the endpoints 110 (e.g., at the TCP layer or UDP) as in existing systems). The CSLs $210_2$ of the CSSs 115 of the endpoints 110 each maintain portions of the service connection information exchanged by the endpoints 110 during service connection establishment interaction 330. For example, the CSL $210_2$ of the CSS 115 of a given endpoint 110 may maintain the service connection identifier for the service connection 340, the service name associated with the CSL $210_2$ of the other endpoint 110, the IP address that is currently being used by the other endpoint 110, the one or more encryption keys for use in the service connection 340, connection parameters for the service connection 340, or the like, as well as various combinations thereof.

The service connection 340 provides a connection between endpoint $110_A$ and endpoint $110_Z$ that is above the transport layer (e.g., the transport layer of the TCP/IP or OSI Stacks, or the TCP/UDP functions of the TL $210_3$ of CSS 115) and below the application layer (e.g., the AL $210_1$ of CSS 115). The service connection 340 has service connection information associated therewith (e.g., the service connection identifier for the service connection 340, one or more encryption keys for use in the service connection 340, connection parameters for the service connection 340, or the like, as well as various combinations thereof). The use of service connection 340 as the connection between endpoint $110_A$ and endpoint $110_Z$ facilitates various functions which may be supported by the CSLs $210_2$ of the CSSs 115 of the endpoints 110.

The service connection 340 may be used for communication between the endpoints 110. The AL $210_1$ at endpoint $110_A$, if it has not already done so (e.g., as a trigger for establishment of the service connection 340), may request communication with the AL $210_1$ at endpoint $110_Z$. The AL $210_1$ at endpoint $110_A$ may request communication with the AL $210_1$ at endpoint $110_Z$ responsive to a request from application $112_A$ of endpoint $110_A$. The AL $210_1$ at endpoint $110_A$ may request communication with the AL $210_1$ at endpoint $110_Z$ by initiating a connection request which is passed from AL $210_1$ at endpoint $110_A$ to CSL $210_2$ of CSS $115_A$ of endpoint $110_A$. The AL $210_1$ at endpoint $110_A$ is not required to perform a name lookup in order to determine the IP address of endpoint $110_Z$, as this function has been pushed to the CSL $210_2$ of CSS $115_A$ of endpoint $110_A$. Accordingly, the connection request from the AL $210_1$ at endpoint $110_A$ may simply include an identifier (other than IP address) which may be used to identify endpoint $110_Z$ (e.g., the service name of the CSL $210_2$ of CSS $115_Z$ at endpoint $110_Z$). The CSL $210_2$ of CSS $115_A$ of endpoint $110_A$ receives the communication request from the AL $210_1$ at endpoint $110_A$, determines the IP address of endpoint $110_Z$ from local information stored by the CSL $210_2$ of CSS $115_A$ of endpoint $110_A$ for the service connection 340 between the CSL $210_2$ of CSS $115_A$ of endpoint $110_A$ and the CSL $210_2$ of CSS $115_Z$ of endpoint $110_Z$ (e.g., stored in conjunction with establishment of the service connection 340, as discussed above), and initiates communication with endpoint $110_Z$ based on the service connection 340. The communication from endpoint $110_A$ to endpoint $110_Z$ may then proceed as it normally would (e.g., via the transport layer, network layer, data link layer, physical layer). The data that is communicated from AL $210_1$ at endpoint $110_A$ to AL $210_1$ at endpoint $110_Z$ may be encrypted by the CSL $210_2$ of CSS $115_A$ of endpoint $110_A$ using the one or more encryption keys associated with the service connection 340 and, similarly, may be decrypted by the CSL $210_2$ of CSS $115_Z$ of endpoint $110_Z$ using based on the one or more encryption keys associated with the service connection 340. It will be appreciated that, although not described in detail, the process for communication from endpoint $110_Z$ to endpoint $110_A$ using service connection 340 would be similar to that described above for communication from endpoint $110_A$ to endpoint $110_Z$ using service connection 340.

The service connection 340 provides various advantages for applications of the endpoints 110, which may include obviating the need for applications or services to be concerned with connectivity (as connectivity is instead provided at the CSLs $210_2$ of the endpoints 110 for use by the higher-layer applications), obviating the need for applications or services to be concerned with failover, enabling restarting of an application or service after a hardware failure, enabling growing of an application or service (e.g., starting a new instance of the application or service and moving already running sessions of the application or service onto the new instance of the application or service in a manner transparent to the application or service clients of the application or service), enabling shrinking of an application or service (e.g., terminating an existing instance of the application or service and moving already running sessions of the application or service from the terminated instance of the application or service onto a different instance of the application or service in a manner transparent to the application or service clients of the application or service), enabling applications to become stateless or at least nearly stateless, handling retransmission timeouts, handling IP address changes (e.g., IP address change notifications) in a manner transparent to the application or service client of the application or service, or the like, as well as various combinations thereof. The service connection 340 also provides various advantages for the endpoints 110 in general, which may include enabling changes to the IP addresses of the endpoints 110 without loss of connectivity (namely, the service connection 340 may actually be used to communicate IP address changes between the endpoints 110, as discussed in additional detail with respect to FIG. 4), enabling the endpoints 110 to use multiple IP addresses (e.g., for multi-homing or various other purposes), or the like, as well as various combinations thereof.

Referring again to FIG. 1, it is noted that the CSLs $210_2$ of the endpoints 110 may be configured to provide various functions based on the service connection between the endpoints 110.

In at least some embodiments, the CSLs $210_2$ of the endpoints 110 may be configured to use authentication information for secure access to the central server 120.

In at least some embodiments the CSLs $210_2$ of the endpoints 110 may be configured to handle various levels of timeouts (e.g., retransmissions, soft IP address changes, hard IP address changes, session cancellation, or the like, as well as various combinations thereof). The CSLs $210_2$ of the endpoints 110 may be configured to handle at least some such timeouts in a manner transparent to the applications 112 of the endpoints 110.

In at least some embodiments, the CSLs $210_2$ of the endpoints 110 may be configured to handle packet retransmissions. The CSLs $210_2$ of the endpoints 110, while the ALs $210_1$ of the endpoints 110 are communicating via a service level connection (e.g., service level connection 340), may handle retransmissions of packets based on a set of retransmission parameters (e.g., connection parameters of the service connection, application layer connection parameters exchanged by the ALs $210_1$ of the endpoints 110, or the like). The CSLs $210_2$ of the endpoints 110 may use an acknowledgment protocol to guarantee that packets are sent, and may retransmit original packets at certain intervals for certain durations according to the set of retransmission parameters. The CSLs $210_2$ of the endpoints 110 may be configured to handle at least some such packet retransmissions in a manner transparent to the applications 112 of the endpoints 110.

In at least some embodiments, the CSLs $210_2$ of the endpoints 110 may be configured to handle IP address changes such that, if the IP address of one or both of the endpoints 110 changes while the ALs $210_1$ of the endpoints 110 are communicating via an application layer session on top of a service connection (e.g., service connection 340), communication between the ALs $210_1$ of the endpoints 110 may continue via the service connection without loss of the service connection and, thus, without requiring reestablishment of the application layer session between the ALs $210_1$ of the endpoints 110. In this manner, IP address changes may be handled in a manner transparent to the applications 112 of the endpoints 110. The operation of endpoints 110 and central server 120 in responding to IP address changes of endpoints 110 is described in additional detail below.

Figure 4:
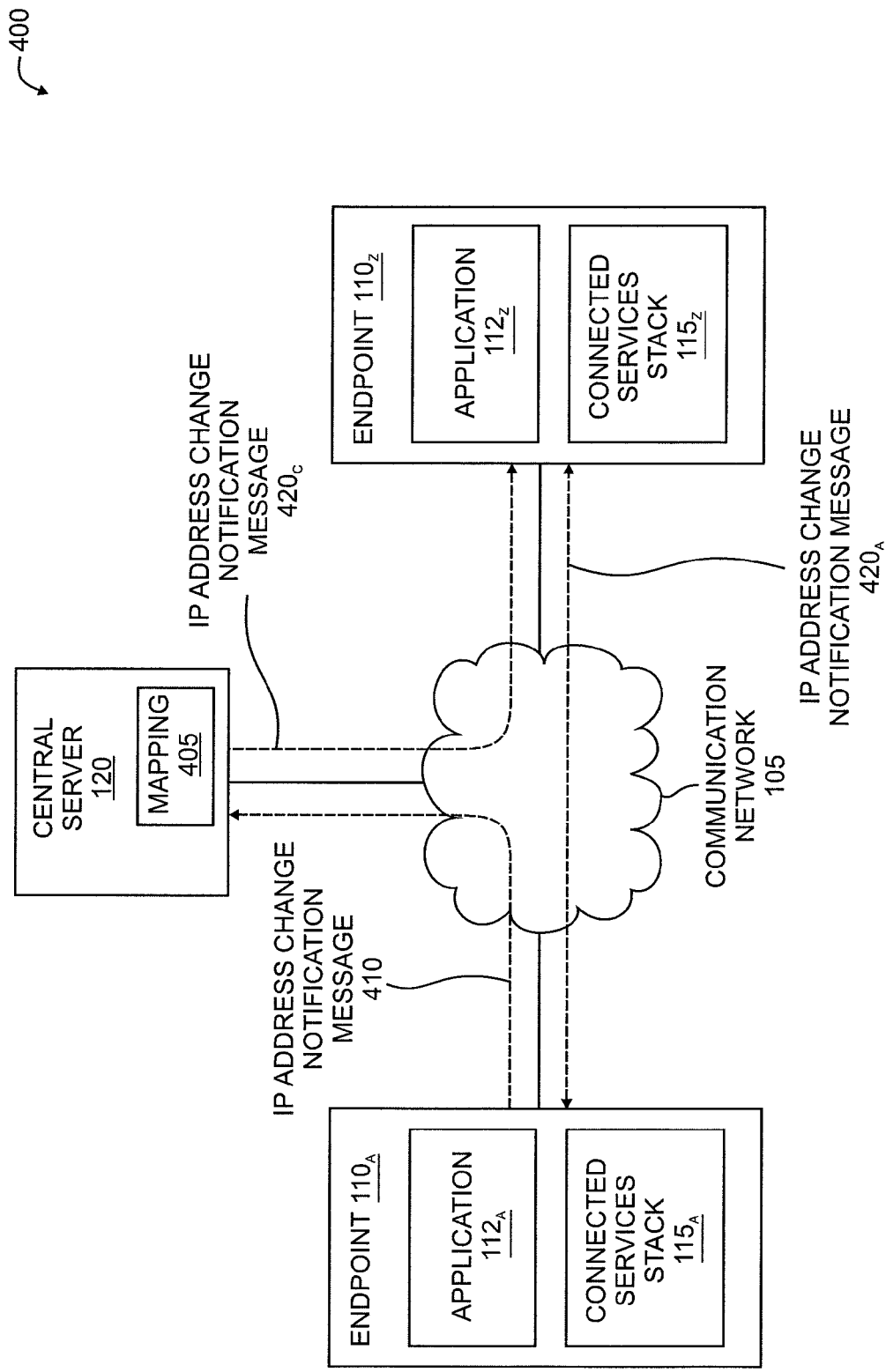
FIG. 4 depicts an exemplary message flow for handling a soft IP address change within the context of FIG. 1.

In at least some embodiments, the CSLs $210_2$ of the endpoints 110 may be configured to handle a soft IP address change in which the IP address of one of the endpoints 110 changes without failure of the one of the endpoints 110 (e.g., an end user device roams to a new wireless access point and is assigned a new IP address, the server on which an application is hosted changes such as when the server on which the application was originally hosted fails, or the like). An exemplary message flow 400, for handling a soft IP address change within the context of the exemplary communication system 100 of FIG. 1, is depicted in FIG. 4. For purposes of clarity, this embodiment is described within the context of a change of the IP address of endpoint $110_A$; however, it will be appreciated that this embodiment also may be used when the IP address of endpoint $110_Z$ changes. If the IP address of endpoint $110_A$ changes, endpoint $110_A$ has a new IP address, but central server 120 and endpoint $110_Z$ are both unaware of the new IP address of endpoint $110_A$. The CSL $210_2$ of endpoint $110_A$ sends an IP address change notification message 410 to the central server 120, and the central server 120 updates a mapping 405 between the service names of the CSLs $210_2$ of the CSSs 115 of the endpoints 110 and the service connection information for the service connection to include the new IP address of endpoint $110_A$. The CSL $210_2$ of endpoint $110_Z$ is then notified of the new IP address of endpoint $110_A$ via an IP address change notification message 420, which may originate from the CSL $210_2$ of endpoint $110_A$ (illustratively, IP address change notification message $420_A$) or from central server 120 (illustratively, IP address change notification message $420_C$). The IP address change notification message 420 includes the service connection identifier of the service connection and the new IP address of endpoint $110_A$. The CSL $210_2$ of endpoint $110_Z$ receives the IP address change notification message 420 and updates the service connection information maintained by the CSL $210_2$ of endpoint $110_Z$ for the service connection between endpoint $110_A$ and endpoint $110_Z$ (e.g., associating the new IP address of endpoint $110_A$ with the service connection identifier of the service connection and other service connection information maintained by the CSL $210_2$ of endpoint $110_Z$ for the service connection). In this manner, both endpoints 110 are able to continue to use the previously established service connection to support application layer communications between the endpoints 110 even though the IP address of endpoint $110_A$ has changed (namely, the service connection identifier remains constant while the IP address of the endpoint $110_A$ changes).

Figure 5:
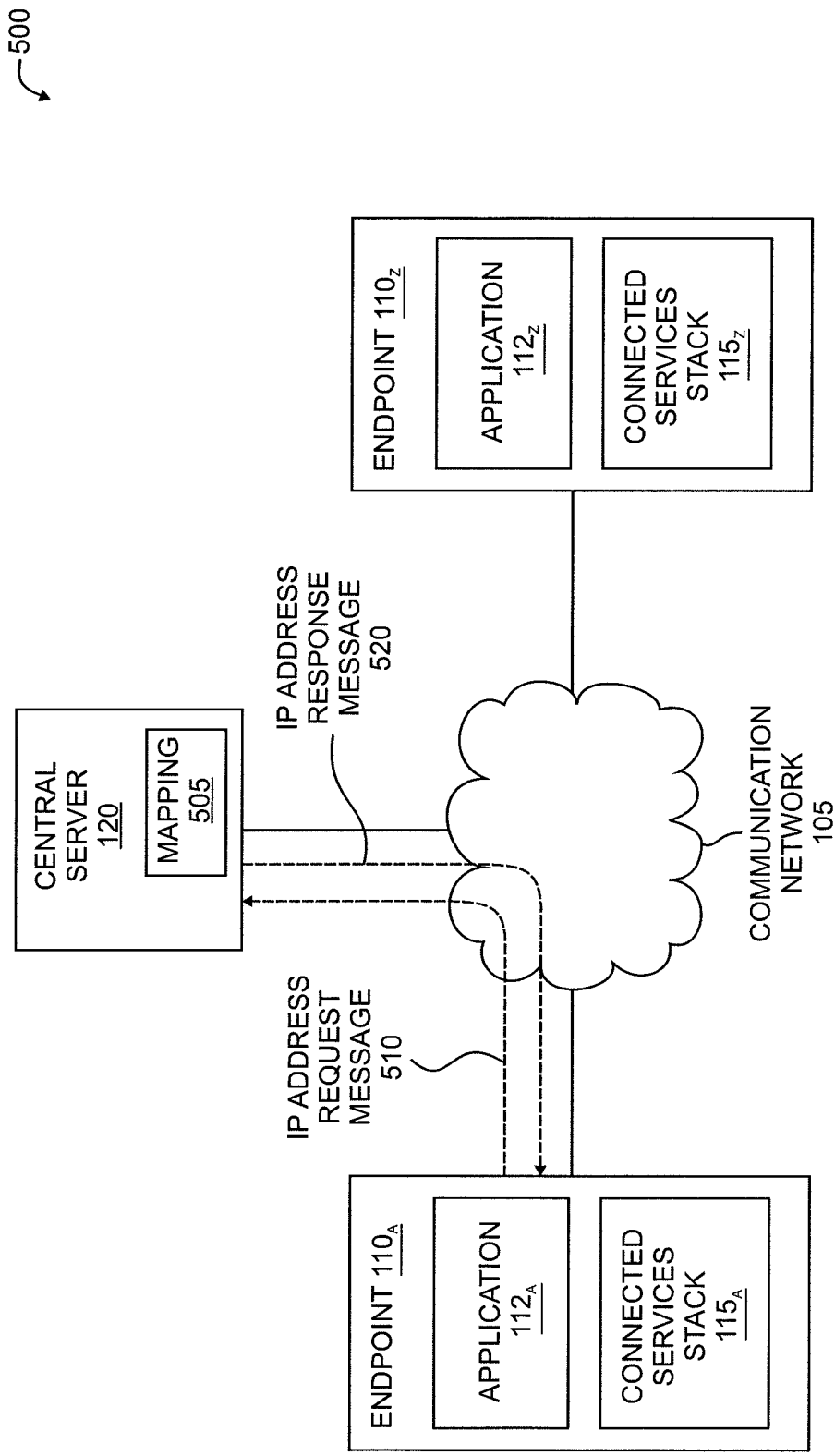
FIG. 5 depicts an exemplary message flow for handling a hard IP address change on one side of a connection within the context of FIG. 1.

In at least some embodiments, the CSLs $210_2$ of the endpoints 110 may be configured to handle a hard IP address change in which one of the endpoints 110 fails and is restarted. An exemplary message flow 500, for handling a hard IP address change on one side of a connection within the context of the exemplary communication system 100 of FIG. 1, is depicted in FIG. 5. For purposes of clarity, this embodiment is described within the context of a failure of endpoint $110_Z$; however, it will be appreciated that this embodiment also may be used when endpoint $110_A$ fails. If endpoint $110_Z$ fails and is restarted, endpoint $110_Z$ is assigned a new IP address, and endpoint $110_A$ is unaware of the new IP address of endpoint $110_Z$ (and may even be unaware, at least for some amount of time, that endpoint $110_Z$ has failed). For example, CSL $210_2$ of endpoint $110_A$ may detect that CSL $210_2$ of endpoint $110_Z$ has failed to acknowledge receipt of packets from endpoint $110_A$ for a threshold length of time (e.g., after a retransmission timeout where CSL $210_2$ of endpoint $110_A$ attempts to retransmit packets to endpoint $110_Z$). The central server 120 is aware of the new IP address of endpoint $110_Z$ and updates a mapping 505 between the service names of the CSLs $210_2$ of the CSSs 115 of the endpoints 110 and the service connection information for the service connection to include the new IP address of endpoint $110_Z$. The CSL $210_2$ of endpoint $110_A$ sends an IP address request message 510 (including the service connection identifier of the service connection) to the central server 120, and the central server 120 obtains the new IP address of endpoint $110_Z$ from the mapping based on the service connection identifier and sends the new IP address of endpoint $110_Z$ to CSL $210_2$ of endpoint $110_A$ in an associated IP address response message 520. In this manner, both endpoints 110 are able to continue to use the previously established service connection to support application layer communications between the endpoints 110 even though the IP address of endpoint $110_Z$ has changed (namely, the service connection identifier remains constant while the IP address of the endpoint $110_Z$ changes).

Figure 6:
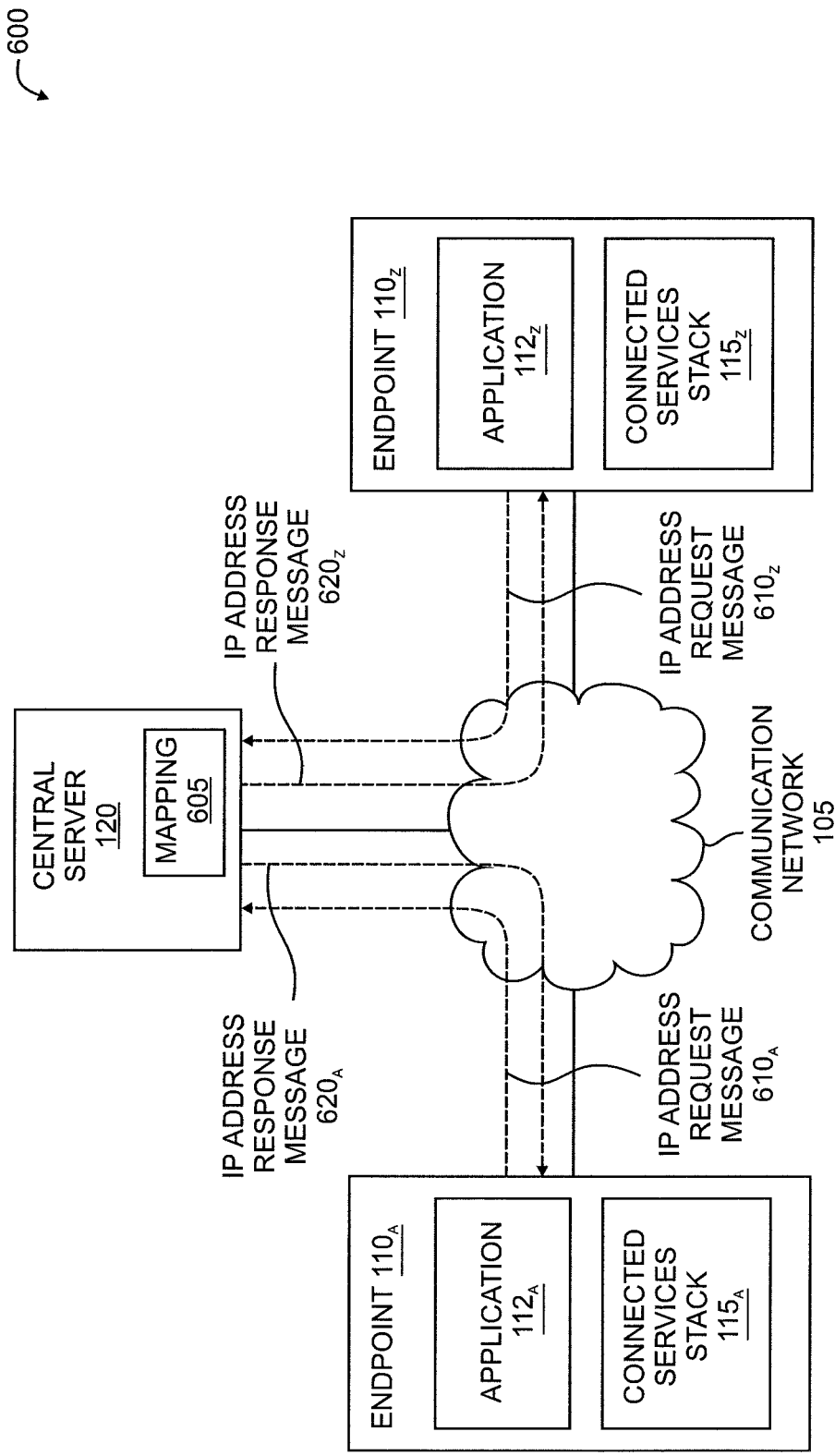
FIG. 6 depicts an exemplary message flow for handling a hard IP address change on both sides of a connection within the context of FIG. 1.

In at least some embodiments, the CSLs $210_2$ of the endpoints 110 may be configured to handle a hard IP address change in which both endpoints 110 fail and are restarted. An exemplary message flow 600, for handling a hard IP address change on both sides of a service connection within the context of the exemplary communication system 100 of FIG. 1, is depicted in FIG. 6. If both endpoint $110_A$ and endpoint $110_Z$ fail and are restarted, both endpoint $110_A$ and endpoint $110_Z$ are assigned new IP addresses, respectively, and neither endpoint 110 is aware of the new IP address of the other endpoint 110. The central server 120 is aware of the new IP addresses of the endpoints 110 and updates a mapping 605 between the service names of the CSLs $210_2$ of the CSSs 115 of the endpoints 110 and the service connection information for the service connection to include the new IP addresses of the endpoints 110. The CSL $210_2$ of endpoint $110_A$ sends an IP address request message $610_A$ (including the service connection identifier of the service connection) to the central server 120, and the central server 120 obtains the new IP address of endpoint $110_Z$ from the mapping based on the service connection identifier and sends the new IP address of endpoint $110_Z$ to CSL $210_2$ of endpoint $110_A$ in an associated IP address response message $620_A$. Similarly, the CSL $210_2$ of endpoint $110_Z$ sends an IP address request message $610_Z$ (including the service connection identifier of the service connection) to the central server 120, and the central server 120 obtains the new IP address of endpoint $110_A$ from the mapping based on the service connection identifier and sends the new IP address of endpoint $110_A$ to CSL $210_2$ of endpoint $110_Z$ in an associated IP address response message $620_Z$. In this manner, both endpoints 110 are able to continue to use the previously established service connection to support application layer communications between the endpoints 110 even though the IP addresses of both endpoints 110 have changed (namely, the service connection identifier remains constant while the IP addresses of the endpoints 110 change). It is noted that, while the first endpoint 110 that restarts may receive stale data, this may be fixed later.

In at least some embodiments in which the new IP address of one of the endpoints 110 is communicated from the one of the endpoints 110 to the other of the endpoints 110, the communication of the new IP address may be performed in a secure manner using the one or more encryption keys of the secure connection.

In at least some embodiments, the CSLs $210_2$ of the endpoints 110 may be configured to support collection of metadata describing the data being transmitted via the secure connection.

In at least some embodiments, the CSLs $210_2$ of the endpoints 110 may be configured to perform accounting functions for data being transmitted via the secure connection (e.g., tracking the bitrate per session, the amount of data transmitted per session, or the like, as well as various combinations thereof).

As discussed above, various embodiments of the service-based networking capability may provide various improvements to, as well as advantages over, existing communication environments. For example, and as discussed above, various embodiments of the service-based networking capability may be used to remove some or all knowledge of the network from applications and services (e.g., by instead handling such knowledge of the network in one or more operating system (OS) layers). For example, and as discussed above, various embodiments of the service-based networking capability enable applications and services to connect to services by name only. For example, and as discussed above, various embodiments of the service-based networking capability obviate the need for applications and services to be concerned with connectivity, as service-based connectivity is instead provided at the CSL of the CSS for use by the higher-layer applications and services. For example, and as discussed above, various embodiments of the service-based networking capability obviate the need for applications and services to be concerned with failover. For example, and as discussed above, various embodiments of the service-based networking capability obviate the need for applications and services to be concerned with movement or expansion/contraction of themselves or services upon which they depend. For example, and as discussed above, various embodiments of the service-based networking capability enable applications to become stateless. For example, various embodiments of the service-based networking capability enable changes to IP addresses of endpoints without loss of connectivity. For example, various embodiments of the service-based networking capability obviate the need to take corrective actions responsive to various conditions (e.g., obviating the need to force an IP address to remain the same while rerouting packets, obviating the need to close an existing networking connection and opening a new networking connection responsive to a failure, or the like). For example, various embodiments of the service-based networking capability enable endpoints to using multiple IP addresses (e.g., for multi-homing purposes or other purposes). For example, various embodiments of the service-based networking capability provide changes to existing implementations of the OS/networking library that enable various layers of the OS/networking library to work in concert without relying on the applications or services to fix or enhance the behavior of the network. For example, various embodiments of the service-based networking capability may prevent or overcome various assumptions, requirements, or disadvantages of existing implementations of networking connections, e.g., machine identifiers being fixed by hardware, machine identifiers being fixed by software such that the IP addresses becomes the machine names, dropped connections responsive to long pauses on connections (e.g., at the TCP layer), or the like, as well as various combinations thereof). For example, various embodiments of the service-based networking capability simplify the IP changes needed to support endpoint mobility, failover, expansion and contraction, and like capabilities and functions. For example, various embodiments of the service-based networking capability provide improvements in use of cloud-based infrastructure (e.g., supporting dynamic expansion and contraction of the cloud, supporting high-availability services, or the like). For example, various embodiments of the service-based networking capability may be configured to handle an active service failure (e.g., in which an active board fails) as follows: (1) the standby service becomes the active service, where the standby service may have the same name, have a different IP address, update a naming service with an indication that the previous IP address is unavailable (e.g., down, inactive, on standby, or the like), inform one or more associated connections or endpoints of the previously active service of the new IP address of the standby service (with or without providing authentication or encryption information), or the like, as well as various combinations thereof and (2) the existing sessions may change to use of the new IP address such that existing sessions continue. For example, various embodiments of the service-based networking capability may be configured to handle multiple active service failures, such as where active services A and B fail (e.g., in which active boards A and B fail), as follows: (1) the standby service A becomes the active service, where the standby service A may have the same name, have a different IP address, update a naming service with an indication that the previous IP address is unavailable (e.g., down, inactive, on standby, or the like), inform one or more associated connections or endpoints of the previously active service A of the new IP address of the standby service A (with or without providing authentication or encryption information), refresh the IP address of active service B via the naming service based on a determination that an update to active service B fails (while potentially also updating connections to "new" active service B), or the like, as well as various combinations thereof and (2) the existing sessions may change to use of the new IP address of the standby service A such that existing sessions continue. Various other improvements to, as well as advantages over, existing communication environments may be realized via embodiments of the service-based networking capability.

Figure 7:
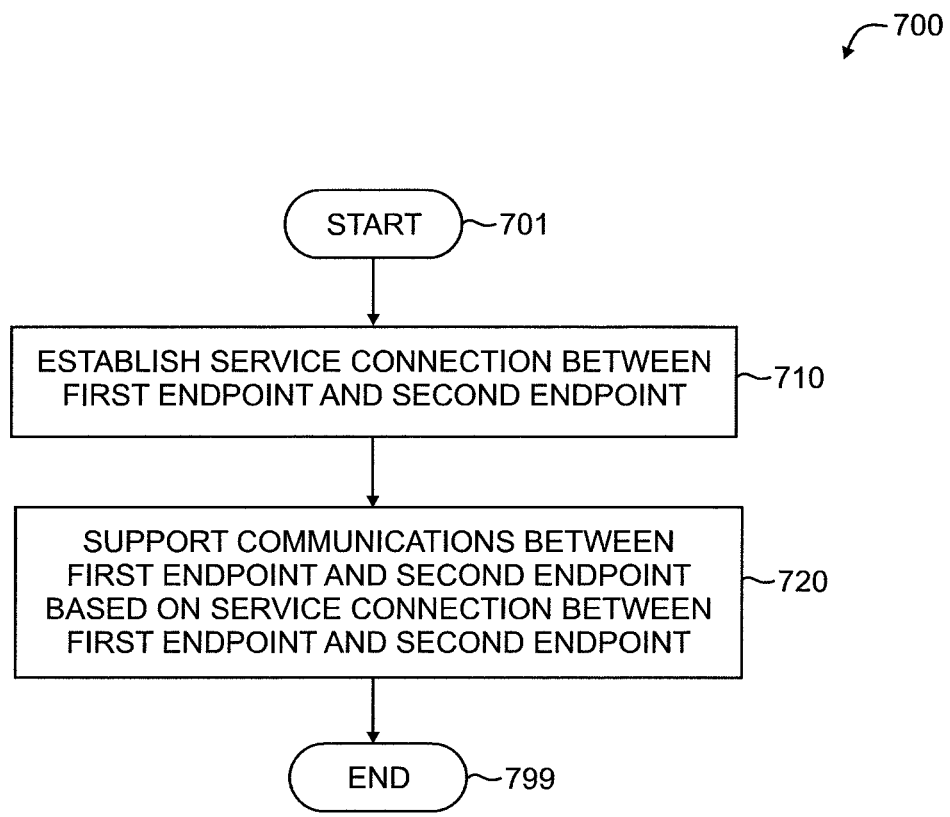
FIG. 7 depicts an exemplary method for establishment and use of a service connection between endpoints.

FIG. 7 depicts an exemplary method for establishment and use of a service connection between endpoints. At step 701, method 700 begins. At step 710, a service connection is established between a first endpoint and a second endpoint. At step 720, communications between the first endpoint and the second endpoint are supported based on the service connection between the first endpoint and the second endpoint. At step 799, method 700 ends. It will be appreciated that various functions depicted and described with respect to FIGS. 1-6 may be provided within the context of method 700 of FIG. 7.

Figure 8:
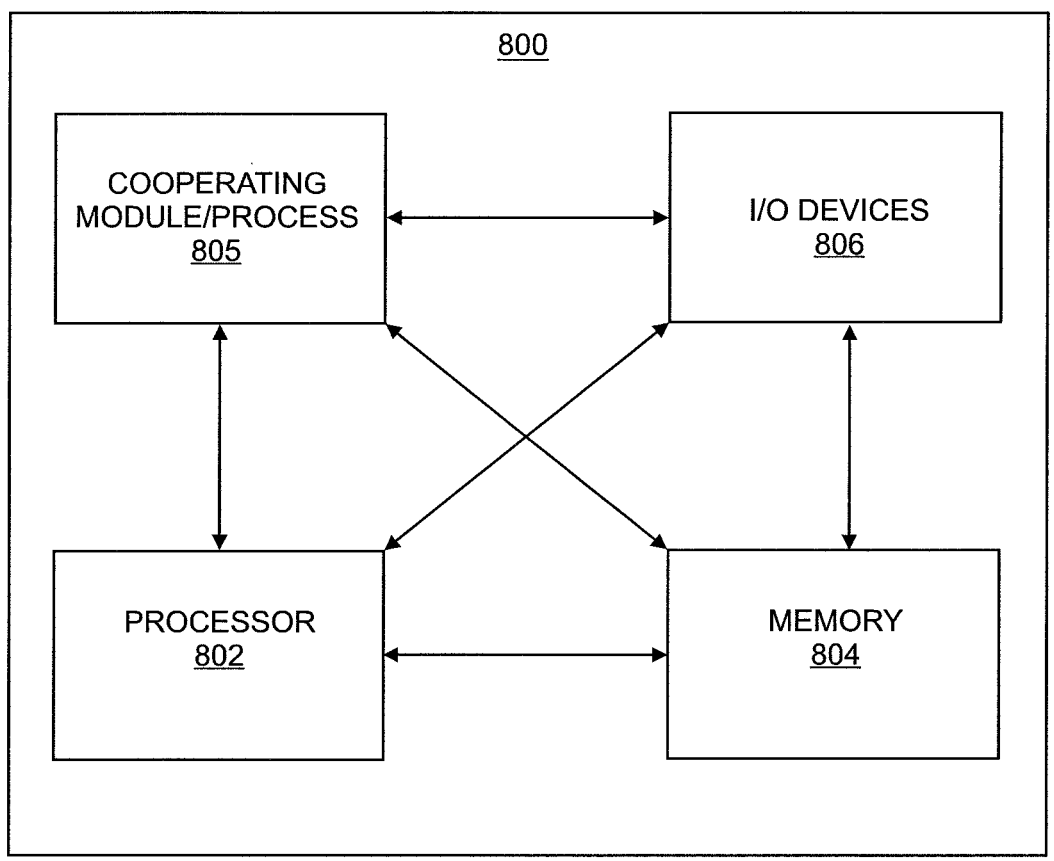
FIG. 8 depicts a high-level block diagram of a computer suitable for use in performing functions presented herein.

FIG. 8 depicts a high-level block diagram of a computer suitable for use in performing functions described herein.

The computer 800 includes a processor 802 (e.g., a central processing unit (CPU) and/or other suitable processor(s)) and a memory 704 (e.g., random access memory (RAM), read only memory (ROM), and the like).

The computer 800 also may include a cooperating module/process 805. The cooperating process 805 can be loaded into memory 804 and executed by the processor 802 to implement functions as discussed herein and, thus, cooperating process 805 (including associated data structures) can be stored on a computer readable storage medium, e.g., RAM memory, magnetic or optical drive or diskette, and the like.

The computer 800 also may include one or more input/output devices 806 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 800 depicted in FIG. 8 provides a general architecture and functionality suitable for implementing functional elements described herein and/or portions of functional elements described herein. For example, computer 800 provides a general architecture and functionality suitable for implementing one or more of an endpoint 110, central server 120, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to run a connected services stack, the connected services stack comprising a connected services layer configured to operate below an application layer and above a transport layer, wherein the connected services layer is configured to support establishment of a service connection between the connected services layer and a remote connected services layer of a remote endpoint, wherein the connected services layer is configured to support establishment of the service connection based on a service name of the connected services layer, a service name of the remote connected services layer, and a service connection identifier for the service connection, wherein the connected services layer is configured to:
send, toward a server, a service connection request message comprising the service name of the connected services layer and the service name of the remote connected services layer of the remote endpoint; and
receive, from the server, a service connection response message comprising the service name of the remote connected services layer of the remote endpoint, an Internet Protocol (IP) address of the remote endpoint, and the service connection identifier for the service connection.

2. The apparatus of claim 1, wherein the service connection response message further comprises one or more encryption keys for the service connection.

3. The apparatus of claim 1, wherein the connected services layer is configured to send the service connection request message responsive to:
a communication request from an application via the application layer; or
a determination that an application is expected to request communication via the application layer.

4. The apparatus of claim 1, wherein the connected services layer is configured to maintain authentication information configured for use by the connected services layer in authenticating with the server.

5. The apparatus of claim 1, wherein the connected services layer is configured to:
  maintain a set of service connection information for the service connection, the set of service connection information comprising the service connection identifier for the service connection, the service name of the remote connected services layer of the remote endpoint, and the IP address of the remote endpoint.

6. The apparatus of claim 1, wherein the connected services layer is configured to:
  initiate establishment of the service connection with the remote connected services layer of the remote endpoint by propagating, toward the remote connected services layer of the remote endpoint, a service connection establishment request message comprising the service connection identifier for the service connection and the IP address of the remote endpoint.

7. The apparatus of claim 6, wherein the connected services layer is configured to:
  participate in a handshake with the remote connected services layer of the remote endpoint for establishing the service connection with the remote connected services layer of the remote endpoint.

8. The apparatus of claim 6, wherein the connected services layer is configured to:
  negotiate a set of service connection parameters with the remote connected services layer of the remote endpoint during establishment of the service connection with the remote connected services layer of the remote endpoint.

9. The apparatus of claim 1, wherein the connected services layer is configured to:
  establish the service connection with the remote connected services layer of the remote endpoint based on the service connection identifier for the service connection and the IP address of the remote endpoint.

10. The apparatus of claim 9, wherein the connected services layer is configured to:
  receive an application communication from an application of the apparatus via the application layer; and
  propagate the application communication toward the remote endpoint using the service connection with the remote connected services layer of the remote endpoint.

11. The apparatus of claim 9, wherein the connected services layer is configured to:
  receive, via the service connection, an application communication from an application of the remote endpoint; and
  propagate the application communication toward an application of the apparatus via the application layer.

12. The apparatus of claim 1, wherein the connected services layer is configured to:
  based on a change of the apparatus from the IP address to a new IP address:
    propagate, toward the server, an IP address change notification message including the service connection identifier for the service connection and the new IP address of the apparatus.

13. The apparatus of claim 1, wherein the connected services layer is configured to:
  based on a change of the apparatus from the IP address to a new IP address:
    propagate, toward the remote connected services layer of the remote endpoint, an IP address change notification message including the service connection identifier for the service connection and the new IP address of the apparatus.

14. The apparatus of claim 13, wherein the apparatus is configured to detect the change of the apparatus from the IP address to the new IP address.

15. The apparatus of claim 13, wherein the connected services layer is configured to encrypt the IP address change notification message, using at least one encryption key associated with the service connection, prior to propagating the IP address change notification message.

16. The apparatus of claim 1, wherein the connected services layer is configured to:
  based on a determination that the remote connected services layer of the remote endpoint has failed to acknowledge receipt of packets from the apparatus for a threshold length of time:
    propagate, toward the server, an IP address request message including the service connection identifier for the service connection; and
    receive, from the server, an IP address response message including a new IP address of the remote endpoint.

17. The apparatus of claim 16, wherein the connected services layer is configured to:
  update a set of service connection information for the service connection, the set of service connection information comprising the service connection identifier for the service connection and the service name of the remote connected services layer of the remote endpoint, the set of service connection information being updated to replace the IP address of the remote endpoint with the new IP address of the remote endpoint.

18. A method, comprising:
  running, by a processor, a connected services stack, the connected services stack comprising a connected services layer configured to operate below an application layer and above a transport layer, wherein the connected services layer is configured to support establishment of a service connection between the connected services layer and a remote connected services layer of a remote endpoint, wherein the connected services layer is configured to support establishment of the service connection based on a service name of the connected services layer, a service name of the remote connected services layer, and a service connection identifier for the service connection, wherein the connected services layer is configured to:
    send, toward a server, a service connection request message comprising the service name of the connected services layer and the service name of the remote connected services layer of the remote endpoint; and
    receive, from the server, a service connection response message comprising the service name of the remote connected services layer of the remote endpoint, an Internet Protocol (IP) address of the remote endpoint, and the service connection identifier for the service connection.

19. A non-transitory computer-readable storage medium storing instructions which, when executed by a computer, cause the computer to perform a method, the method comprising:
  running a connected services stack, the connected services stack comprising a connected services layer configured to operate below an application layer and above a transport layer, wherein the connected services layer is configured to support establishment of a service connection between the connected services layer and a remote connected services layer of a remote endpoint, wherein the connected services layer is configured to support establishment of the service connection based on a service name of the connected services layer, a service name of the remote connected services layer, and a service connection identifier for the service connection, wherein the connected services layer is configured to:

send, toward a server, a service connection request message comprising the service name of the connected services layer and the service name of the remote connected services layer of the remote endpoint; and receive, from the server, a service connection response message comprising the service name of the remote connected services layer of the remote endpoint, an Internet Protocol (IP) address of the remote endpoint, and the service connection identifier for the service connection.

* * * * *